US007154726B2

(12) United States Patent
Barlage et al.

(10) Patent No.: US 7,154,726 B2
(45) Date of Patent: Dec. 26, 2006

(54) PLUGGABLE ELECTRICAL APPARATUS, IN PARTICULAR SURGE ARRESTER

(75) Inventors: Jutta Barlage, Forchheim (DE); Peter Zeller, Pichl bei Wels (AT); Sarah Sitzler, Untersiggenthal (CH)

(73) Assignee: ABB Schweiz AG, Baden (CH)

( * ) Notice: Subject to any disclaimer, the term of this patent is extended or adjusted under 35 U.S.C. 154(b) by 413 days.

(21) Appl. No.: 10/618,771

(22) Filed: Jul. 15, 2003

(65) Prior Publication Data

US 2004/0057185 A1 Mar. 25, 2004

(30) Foreign Application Priority Data

Jul. 15, 2002 (EP) ................................ 02405606.1

(51) Int. Cl.
*H02H 1/00* (2006.01)

(52) U.S. Cl. ........................ 361/117; 361/127; 361/118

(58) Field of Classification Search ................. 361/117
See application file for complete search history.

(56) References Cited

U.S. PATENT DOCUMENTS

| | | | | |
|---|---|---|---|---|
| 5,113,306 | A | 5/1992 | Veverka et al. | |
| 5,684,665 | A * | 11/1997 | Rudy | 361/117 |
| 6,594,133 | B1 * | 7/2003 | Schmidt et al. | 361/117 |
| 6,678,139 | B1 * | 1/2004 | Greuter et al. | 361/117 |

FOREIGN PATENT DOCUMENTS

| | | |
|---|---|---|
| EP | 1 083 579 | 3/2001 |
| FR | 2 485 245 | 12/1981 |

* cited by examiner

*Primary Examiner*—Brian Sircus
*Assistant Examiner*—Terrence Willoughby
(74) *Attorney, Agent, or Firm*—Buchanan Ingersoll & Rooney PC

(57) ABSTRACT

The pluggable electrical apparatus, formed in particular as a surge arrester (A), has an axially symmetrical housing (1) with a housing axis (7) running in the plugging direction, a flange (5) for fastening the apparatus housing (1) on a housing (30) of a high-voltage installation (H) and an axially symmetrical active part (6). In order to make it possible for this apparatus (A) to be fitted into the high-voltage installation (H) in a simple manner, the flange (5) is formed into the apparatus housing (1) and the active part (6) is mounted displaceably in the axial direction in the apparatus housing (1) and held with a prestressing force with respect to the apparatus housing (1) before a plug-in connection is formed.

18 Claims, 3 Drawing Sheets

PLUGGABLE ELECTRICAL APPARATUS, IN PARTICULAR SURGE ARRESTER

FIELD OF THE INVENTION

The invention is based on a pluggable electrical apparatus, in particular a surge arrester, according to the precharacterizing clause of patent claim 1. This apparatus has an axially symmetrically formed housing with a housing axis running in the plugging direction and also a means for fastening the apparatus housing on a housing of a high-voltage installation. Furthermore, the electrical apparatus has an axially symmetrical active part with an axially routed circuit, including a plug-in contact, a grounding terminal and a non-linear resistance element connected in between. The active part also includes an axially symmetrical insulator, which forms an insulating cone and surrounds the non-linear resistance element and an electrical connection with respect to the plug-in contact. High voltage is understood here to mean nominal voltages greater than 1 kV and typically up to 72 kV.

When the apparatus is fitted into the high-voltage installation, the active part is plugged into a socket of the high-voltage installation and the apparatus housing is fixed on the installation housing by the fastening means. During plugging, the circuit of the apparatus is connected in an electrically conducting manner to a current conductor of the high-voltage installation and at the same time the insulating cone and a mating insulating cone of the installation are pressed against each other without a gap. This achieves a plug-in connection which can withstand high loads and has a dielectrically high-grade insulation. The electrical apparatus is generally a surge arrester and then has a non-linear, voltage-dependent resistance element, for instance based on a varistor and/or a spark gap. It may, however, also be given the form of a grounding switch and then has a switching point as the non-linear resistance element.

The invention also relates to a high-voltage installation with such an electrical apparatus and to a method by which such an installation can be produced.

BACKGROUND OF THE INVENTION

With the precharacterizing clause, the invention refers to a prior art of electrical apparatuses, as described in EP 1 083 579 A2. A pluggable surge arrester described in this patent publication includes a metal housing which is configured in the form of a bottle, is aligned along an axis and has a largely axially symmetrically formed active part. The active part has an axially routed circuit with a varistor and with two current terminals. The circuit is fixed in the metal housing in an electrically isolated manner by an insulator. Both current terminals of the circuit are led out of the housing. One of the two current terminals can be led to high voltage, the other to ground potential. This surge arrester can be fitted into a high-voltage installation by plugging. When doing so, the plug-in contact and a mating plug-in contact of the installation are plugged together and an electrically conducting connection is produced in this way between the circuit and a conductor of the installation which can be subjected to high voltage. A fastening means supported on the housing by means of a compression spring and given the form of a flange is then firmly bolted onto the installation housing. The arrester is held on the installation with a defined force and in a resilient way by means of the compression spring, which is prestressed during the bolting.

SUMMARY OF THE INVENTION

The invention, as it is defined in the patent claims, achieves the object of providing an electrical apparatus of the type stated at the beginning which can be fitted into the high-voltage installation in a particularly simple way.

In the case of the apparatus according to the invention, the fastening means is formed into the apparatus housing and the active part is mounted displaceably in the axial direction in the apparatus housing and held with a prestressing force with respect to the apparatus housing before a plug-in connection is formed. The apparatus housing can in this way be fastened on the high-voltage installation virtually without any force being exerted. An electrically conducting connection between the circuit of the apparatus according to the invention and a conductor of the installation which can be subjected to high voltage can be achieved with simple means by reducing the prestressing. This involves displacing the active part of the apparatus in the axial direction until the plug-in contact forms a plug-in connection with a mating plug-in contact of the installation and the insulating cone of the active part bears with a predetermined force and no gap against a mating insulating cone of the installation. The supporting force can consequently be dimensioned very accurately and accordingly set such that gaps leading to partial discharges at the boundary surface of the insulating cones are avoided. Since the supporting force can easily be kept constant and, moreover, acts in the interior of the apparatus housing, a constant contact pressure is ensured and, moreover, changing of the contact pressure from the outside, for instance by the apparatus housing being loaded with mechanical force, is prevented with certainty.

In order effectively to reduce partial discharges between the surface of the insulator and the apparatus housing, it is expedient to provide the insulator with an electrically conductive layer. The insulating cone, which is exposed to high electric field strengths during the operation of the installation, is kept free of this layer. The end of the insulating cone remote from the plug-in contact is advantageously formed with an undercut and bears an inwardly disposed, rounded portion of the electrically conductive layer. These measures achieve the effect of greatly relieving the end of the insulating cone that undergoes high dielectric loading during the operation of the installation.

There is a favorable effect on the dielectric behavior of the apparatus or the installation if the non-linear resistance element provided in the apparatus circuit is on the plug-in contact side and the electrically conducting connection, similarly provided in the apparatus circuit, of this resistance element to the plug-in contact is given a rounded form. A further improvement in the dielectric strength is achieved if the insulator is given a rounded configuration, at least in the region on the plug-in contact side that is exposed to high electric field strengths.

In order to facilitate the fitting of the electrical apparatus in the installation, it is recommendable to form an opening in a lateral surface of the apparatus housing. The position of a marking of the insulator can be observed through this opening during the fitting. On the basis of this information, the fitter can easily check whether the active part of the apparatus has already been displaced sufficiently far. At the same time, this opening serves for relieving the pressure on the apparatus when accidental arcs and partial discharges occur on the active part. Since such undesired discharging processes are particularly effective in the region of high electric field strengths, it is recommendable to position the opening opposite a region of the insulator which comprises the end of the non-linear resistance element on the plug-in contact side. When the apparatus housing is formed as a cylinder, at least two openings arranged offset with respect to each other in the circumferential direction of the cylinder are expediently provided, since the marking can in this way be observed not just from one direction but over an angular range predetermined by the angle of offset.

In the case of an apparatus with a grounding terminal fastened to a groundable end of the active part and led to the outside through a base of the apparatus housing, the required prestressing force is preferably achieved by a prestressed compression spring, which is arranged between the groundable end of the active part and the base of the apparatus housing. In order to be able to change the prestress simply and precisely, a thread for receiving a clamping nut is formed into the end of the grounding terminal led out from the apparatus housing. This thread is advantageously adjoined by a thread-free portion which is led out from the apparatus housing and serves for the mounting of a securing sleeve which can be provided between the clamping nut and the base of the apparatus housing. If this sleeve is removed after the apparatus has been fitted, no force can be transferred any longer to the active part of the apparatus when the clamping nut is actuated, so that improper dismantling or servicing of the apparatus by unauthorized persons is ruled out. When formed as a check nut, the clamping nut may be used for the purpose of connecting the grounding terminal to a grounding conductor.

In a robust embodiment of the apparatus according to the invention that can be easily realized, a sleeve which is axially aligned and encloses the grounding terminal is formed into the base of the apparatus housing, with a lateral surface serving for guiding the compression spring.

In order to compensate for different dimensions of the fastening means of the apparatus housing and the installation housing, it is recommendable to use for the fitting of the apparatus an adapter flange which is provided between a flange of the fastening means of the electrical apparatus and a mating flange of the installation housing and reduces the dimensions of one flange to the dimensions of the other flange.

The apparatus housing and the installation housing are advantageously given an electrically conductive form. After the apparatus has been fitted, the apparatus housing is then grounded without an additional connection via the flanges and the installation housing and protection against electric shock is ensured.

BRIEF DESCRIPTION OF THE DRAWINGS

A preferred exemplary embodiment of the invention and the further advantages which can be achieved with it are explained in more detail below on the basis of drawings, in which.

DETAILED DESCRIPTION OF THE INVENTION

Figure 1:
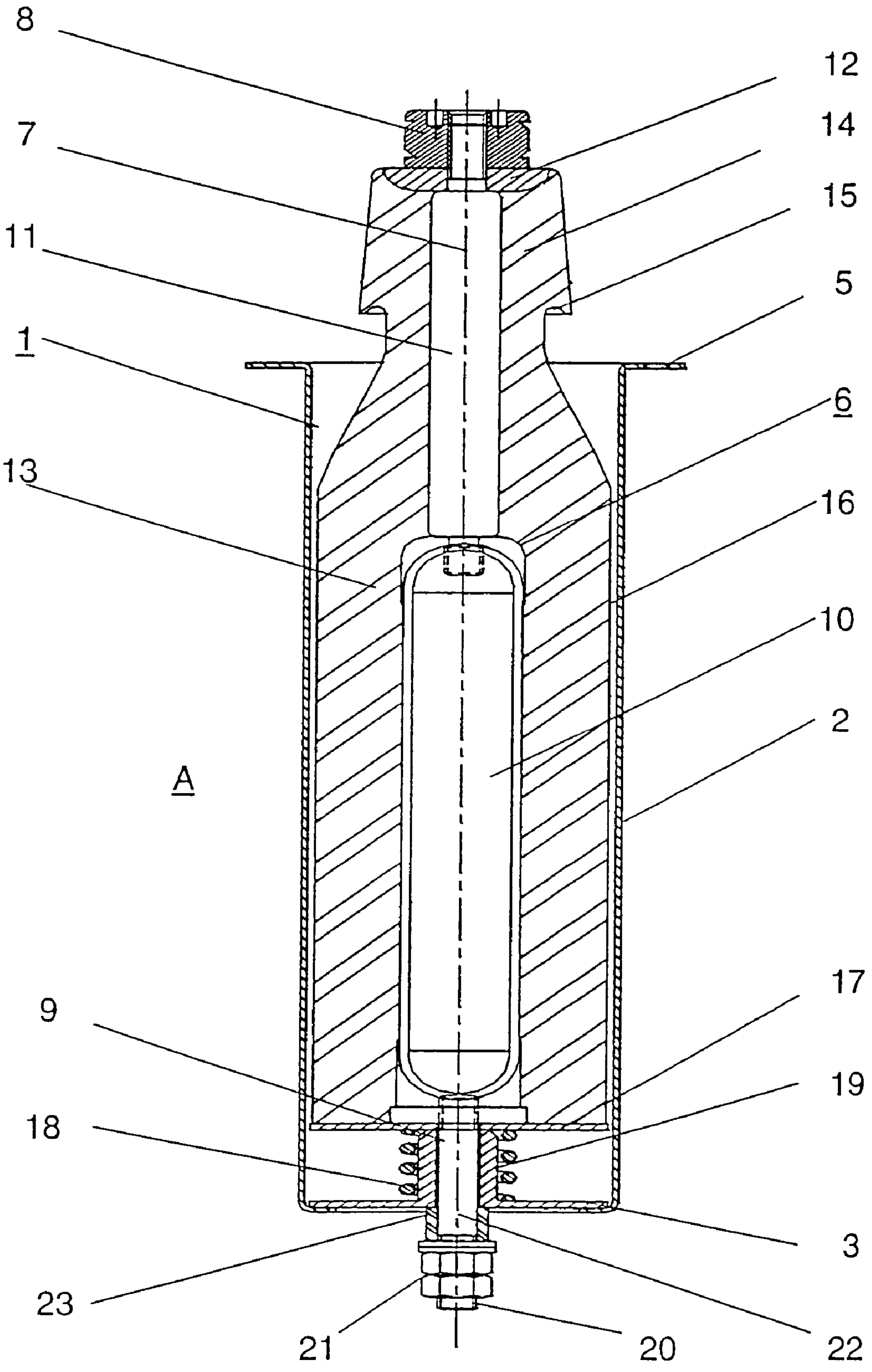
FIG. 1 shows a plan view of a section taken along an axis through an embodiment of the pluggable electrical apparatus according to the invention, given the form of a surge arrester.

In all the figures, the same reference numerals designate parts which also act in the same way. The surge arrester A represented in FIG. 1 has as protection against electric shock and as protection against outside influences a predominantly cylindrical, electrically conductive apparatus housing 1, which consists in particular of metal, such as for instance aluminum, an electrically conductive polymeric material, for example a polyethylene filled with conductive carbon black, or a polymeric material provided with an electrically conductive sheath, such as for instance polyethylene. The housing 1 includes a casing tube 2. Attached to the lower end of the tube is a base 3, while formed into the upper end is a fastening means, which is given the form of a radially outwardly extended flange 5. Arranged in the apparatus housing 1 is an active part 6. The inside diameter of the apparatus housing is oversized with respect to the active part. The active part can therefore be displaced along the cylinder axis 7 of the housing 1. The active part includes an axially routed circuit with a plug-in contact 8, a grounding terminal 9 and a non-linear resistance element 10. An end of the resistance element 10 that can be led to high-voltage potential is connected to the plug-in contact 8 via a conductor bolt 11. The other end of the element 10 is connected to the grounding terminal 9, configured in the form of a bolt. The non-linear resistance element 10 may be formed in the way described in the prior art according to EP 1 083 579 A2 and then has one or more cylindrical varistor elements of non-linear resistance material, for instance based on metal oxide, such as in particular ZnO. The plug-in contact 8 is fastened on a field-controlling disk 12, which serves as a stop with respect to a mating stop of the installation H when the surge arrester A is attached onto a high-voltage installation H represented in FIGS. 2 and 3, for example metal-clad, gas-insulated switchgear for a nominal voltage of, for example, 42 kV.

The non-linear resistance element 10 and the conductor bolt 11 are surrounded by an axially symmetrical insulator 13 made of an elastic insulating material, such as preferably silicone. The insulator 13 runs out at its upper end into an insulating cone 14 coaxially surrounding the upper portion of the conductor bolt 11 of the circuit. An end of the insulating cone 14 remote from the plug-in contact 8 runs out in an inwardly disposed, rounded undercut 15. The surface of the insulator 13 is coated with a potential-controlling, electrically conductive layer 16, for instance made of a conductive polymer or a metal, apart from the cone surface of the insulating cone 14. The electrically conductive layer 16 is connected to ground potential via a contact disk 17, terminating the active part 6 in the downward direction at the grounding terminal 9.

Arranged between the contact disk 17 and the base 3 of the apparatus housing 1 is a prestressed compression spring 18. This spring is disposed on a lateral surface of a bearing sleeve 19, which is formed into the base 3 of the apparatus housing 1 and axially aligned. Mounted displaceably in the axial direction in the sleeve 19 is the grounding terminal 9. A thread 20, onto which a clamping nut 21 given the form of a check nut is screwed, is formed into an end of the grounding terminal 9 led out from the apparatus housing 1. The thread 20 is adjoined by a thread-free portion 22, likewise led out from the apparatus housing 1, for the mounting of a securing sleeve 23 provided between the clamping nut 21 and the base 3 of the apparatus housing 1.

Figure 2:
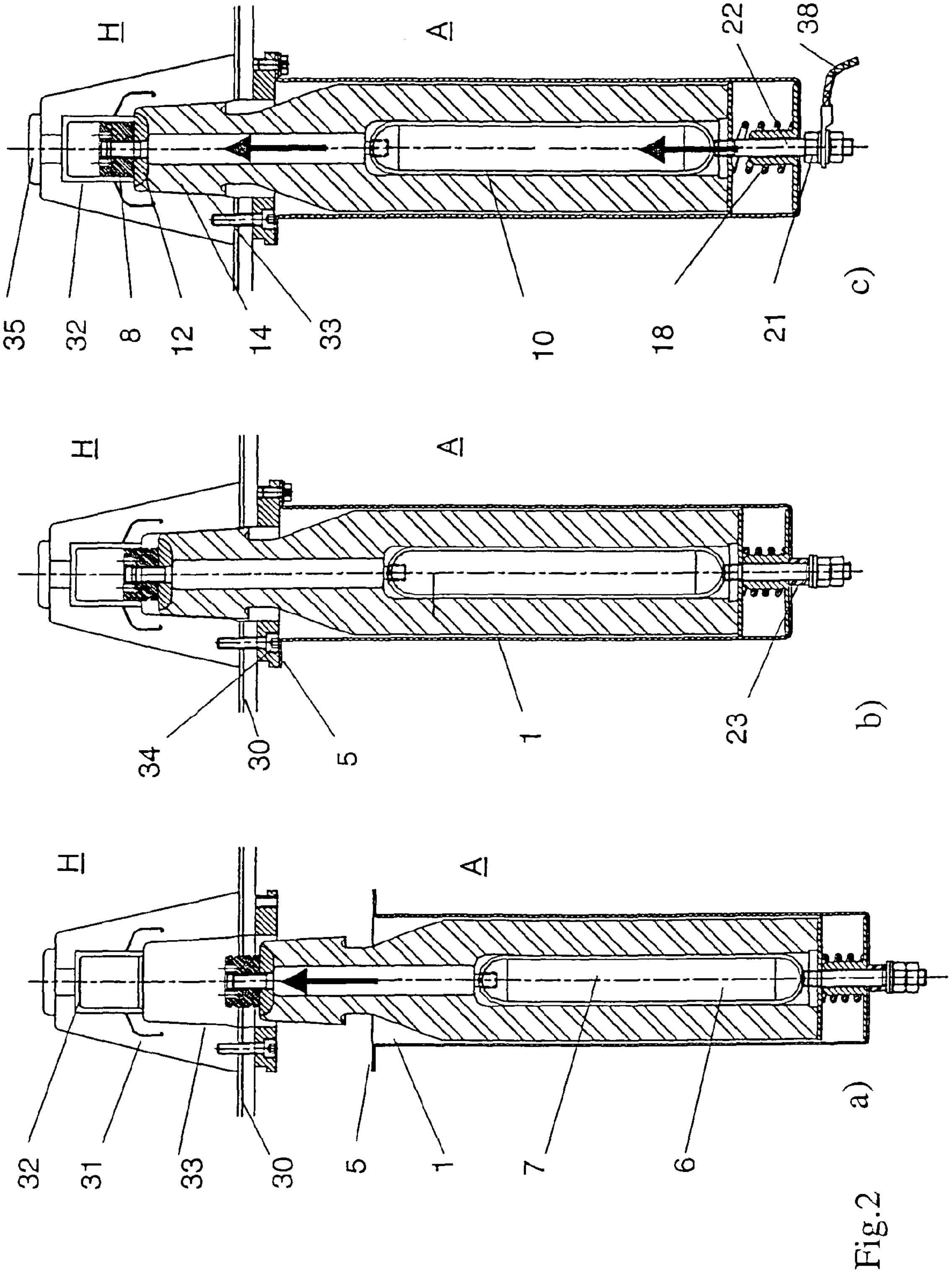
FIG. 2 shows the sectionally represented surge arrester according to FIG. 1 when it is being fitted into a high-voltage installation during three phases a), b), c), following one another at successive times.

It can be seen from FIG. 2 that, when it is fitted into a high-voltage installation H, the surge arrester A is (method phase a)) firstly taken vertically upward in the direction of an undesignated arrow. The upper end of the active part 6 is thereby pushed through an undesignated opening of an electrically conducting, grounded housing 30 of the high-voltage installation H into a connecting socket 31 with a shielded, tulip-shaped mating plug-in contact 32 and with a mating insulating cone 33.

As soon as the flange 5 bears against a suitable mating flange of the installation housing 30 (method phase b)), the two flanges are connected to each other with the aid of undesignated screws and the apparatus housing 1 is in this way rigidly fastened to the installation housing 30. If the flange 5 and the mating flange of the installation H have different dimensions, an adapter flange 34 is to be provided between the two flanges—as represented in FIG. 2.

Subsequently, the prestressed compression spring 18 is relieved with the aid of the clamping nut 21. As this happens, the clamping nut is supported with its upper side via shims on the downwardly facing end of the securing sleeve 23. When the clamping nut turns, the active part is inserted into the connecting socket 31 under the action of the relaxing spring 18, until the disk 12 strikes against the mating plug-in contact 32 (method phase c)). Plug-in contact 8 and mating plug-in contact 32 then form a plug-in connection and connect the circuit of the surge arrester to a current conductor 35 of the installation H which can be subjected to high voltage. The compression spring 18 is relieved only to the extent that the remaining spring force is still sufficient to press the cones 14, 33 onto each other enough for no air gap to remain in between. A sufficiently high dielectric strength of the surge arrester A fitted into the high-voltage installation H is then ensured. Since the spring 18 constantly acts with the same force and, moreover, is arranged in the interior of the apparatus housing 1, a constant contact pressure is ensured and, moreover, changing of the contact pressure from the outside, for instance by the apparatus housing 1 being loaded with mechanical force, is prevented with certainty.

The electrically conductive layer 16, by which partial discharges between the surface of the insulator 13 and the apparatus housing 1 and also inhomogeneities of the insulator 13 are avoided, also contributes to improving the dielectric strength. By forming the end of the insulating cone 14 remote from the plug-in contact 8 as an inwardly disposed and rounded undercut 15 and providing a portion of the electrically conductive layer 16 on the surface of this undercut 15, the electric field is homogenized in the dielectrically critical triple region of the apparatus or installation housing, insulating cone 14 or mating insulating cone 13 and air. Further measures for improving the dielectric properties of the surge arrester A or the high-voltage installation H are also that the non-linear resistance element 10 and/or the insulator 13 are given a rounded form, at least on the plug-in contact side.

Figure 3:
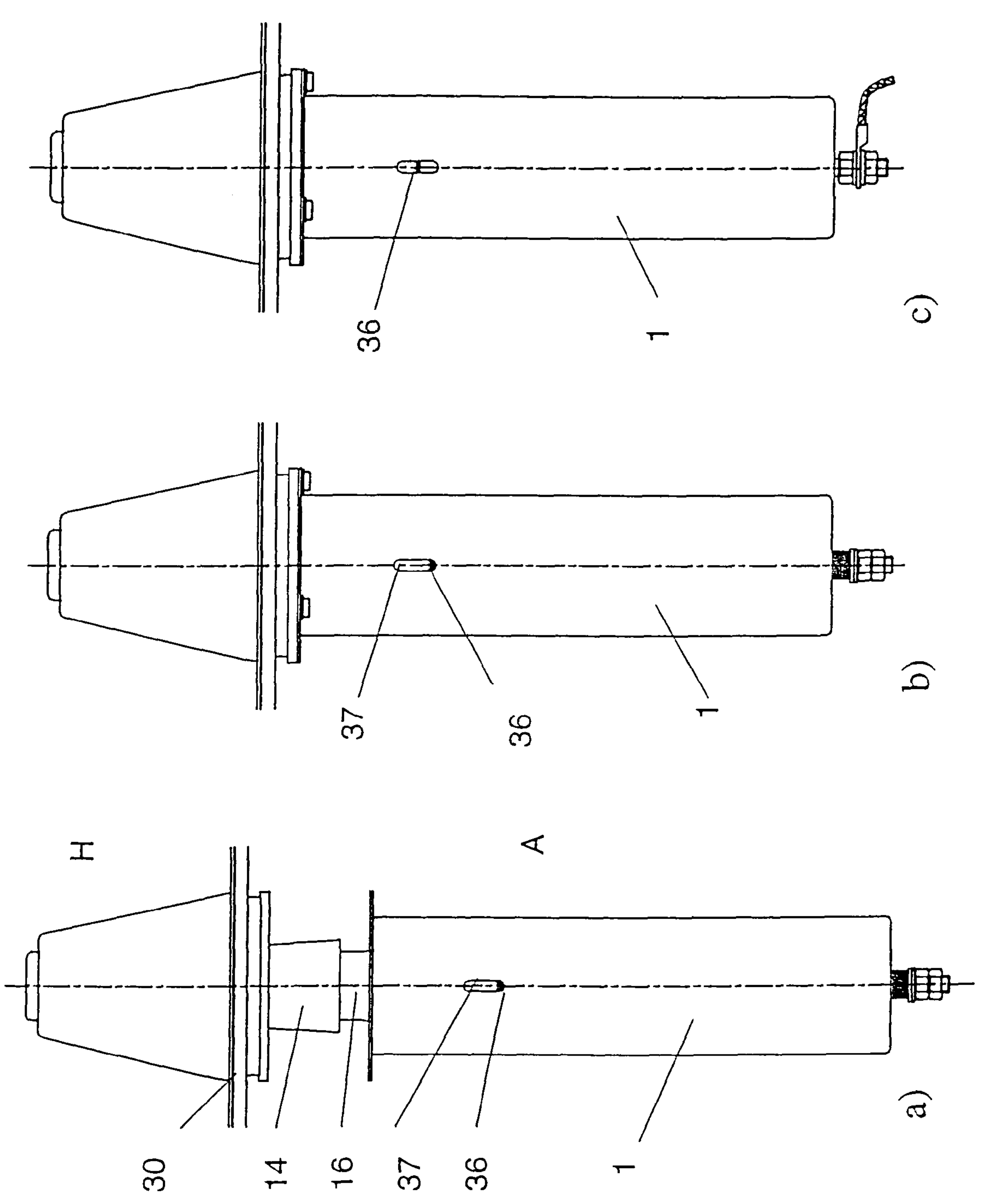
FIG. 3 shows a side view of the (not sectionally represented) surge arrester according to FIG. 1 during the fitting phases a), b), c), following one another at successive times, according to FIG. 2.

As can be seen from FIG. 3, the position of the active part 6 in the connecting socket can be checked during the fitting of the surge arrester with the aid of a marking 36 provided on the active part or the layer 16. For this purpose, a narrow opening 37, disposed predominantly in the axial direction, is formed into the lateral surface of the apparatus housing 1. During the phases a) and b), the position of the marking 36 in the opening 37 does not change, since the active part is not displaced with respect to the apparatus housing 1 with the compression spring prestressed. Only in phase c) is the mark 36 displaced upward with respect to the apparatus housing 1 when the spring relaxes, and assumes the position that can be seen from phase c) once the active part has been inserted completely into the connecting socket.

The opening 37 is positioned opposite a region of the insulator 13 which comprises the end of the non-linear resistance element 10 on the plug-in contact side. This is of advantage to the extent that the opening 37 can serve at the same time for relieving the pressure of the surge arrester A when accidental arcs and partial discharges occur on the active part 6. Since such undesired discharging processes are particularly effective in the region of high electric field strengths, the opening is positioned at the end of the non-linear resistance element 10 on the plug-in contact side.

Two openings arranged offset with respect to each other in the circumferential direction are expediently provided. In this way it is ensured that the position of the marking 36 can be observed not just from one direction but over an angular range predetermined by the angle of offset. By providing more than two openings, suitably distributed over the entire circumference, it can be observed from virtually any desired direction.

After the surge arrester A has been fitted, the clamping nut 21 is drawn off from the thread 20 and the securing sleeve 23 is removed and kept safe from unauthorized access. The clamping nut 21 is again screwed onto the thread 20. Since it is configured as a check nut, it serves at the same time for fixing a grounding conductor 38 (FIG. 2). The circuit of the surge arrester is then connected on the one hand to the high voltage carried in the high-voltage installation H and on the other hand to ground. The apparatus housing 1 is grounded via the adapter flange 34 and the installation housing 30. Unauthorized displacing of the active part 6 after the surge arrester A has been fitted into the high-voltage installation H is avoided by the fact that, when the securing sleeve has been pulled off, the clamping nut 21 can only be turned as far as the thread-free portion 22, and consequently no displacing of the active part can be effected without the securing sleeve 23.

LIST OF DESIGNATIONS

| | |
|---|---|
| 1 | apparatus housing |
| 2 | casing tube |
| 3 | base |
| 5 | flange |
| 6 | active part |
| 7 | cylinder axis |
| 8 | plug-in contact |
| 9 | varistor elements |
| 10 | non-linear resistance element |
| 11 | conductor bolt |
| 12 | disk |
| 13 | insulator |
| 14 | insulating cone |
| 15 | undercut |
| 16 | electrically conductive layer |
| 17 | contact disk |
| 18 | compression spring |
| 19 | bearing sleeve |
| 20 | thread |
| 21 | clamping nut |
| 22 | thread-free portion |
| 23 | securing sleeve |
| 30 | installation housing |
| 31 | connecting socket |
| 32 | mating plug-in contact |
| 33 | mating insulating cone |
| 34 | adapter flange |
| 35 | current conductor |
| 36 | marking |

-continued

| LIST OF DESIGNATIONS | |
|---|---|
| 37 | opening |
| 38 | grounding conductor |
| A | surge arrester |
| H | high-voltage installation |

The invention claimed is:

1. A pluggable electrical apparatus, comprising:

an axially symmetrically formed apparatus housing with a housing axis running in the plugging direction, the apparatus housing having an integral flange for fastening the apparatus housing on a housing of a high-voltage installation;

an axially symmetrical active part with an axially routed circuit, including a plug-in contact, a grounding terminal and a non-linear resistance element connected in between; and an axially symmetrical insulator, which forms an insulating cone and surrounds the non-linear resistance element and an electrical connection with respect to the plug-in contact, wherein the flange for fastening is fixed at an end of the apparatus housing, the apparatus housing being electrically conductive, and wherein the active part is mounted displaceably in the axial direction in the apparatus housing.

2. The apparatus as claimed in claim 1, wherein the insulator is provided with an electrically conductive layer.

3. The apparatus as claimed in claim 2, wherein an end of the insulating cone remote from the plug-in contact is configured as an undercut and bears an inwardly disposed, rounded portion of the electrically conductive layer.

4. The apparatus as claimed in claim 1, wherein the non-linear resistance element is given a rounded form on the plug-in contact side.

5. The apparatus as claimed in claim 4, wherein the insulator is given a rounded configuration, at least on the plug-in contact side.

6. The apparatus as claimed in claim 1, wherein an opening is formed into a lateral surface of the apparatus housing.

7. The apparatus as claimed in claim 6, wherein the opening is positioned opposite a region of the insulator which comprises the end of the non-linear resistance element on the plug-in contact side.

8. The apparatus as claimed in claim 6, wherein, when the apparatus housing is formed as a cylinder, at least two openings arranged offset with respect to each other in the circumferential direction of the cylinder are provided.

9. The apparatus as claimed in claim 1, in which the grounding terminal is fastened to a groundable end of the active part and led through a base of the apparatus housing, wherein a prestressed compression spring is arranged between the groundable end of the active part and the base of the apparatus housing, and wherein the active part is held with a prestressing force with respect to the apparatus housing before a plug-in connection is formed.

10. The apparatus as claimed in claim 9, in which a thread is formed into an end of the grounding terminal led out from the apparatus housing, wherein the thread serves for receiving a clamping nut, and in that the grounding terminal has a thread-free portion which is led out from the apparatus housing and serves for the mounting of a securing sleeve which can be provided between the clamping nut and the base of the apparatus housing.

11. The apparatus as claimed in claim 9, wherein a bearing sleeve which is axially aligned and encloses the grounding terminal is formed into the base of the apparatus housing, with a lateral surface serving for guiding the compression spring.

12. A high-voltage installation with the electrical apparatus as claimed in claim 1, with a fastening means for the electrical apparatus provided on a housing of the installation and with a mating plug-in contact and a mating insulating cone, in which installation, after plugging together, the fastening means of the installation housing and the flange for fastening the apparatus housing are rigidly connected and the insulating cone and the mating insulating cone are pressed against each other without a gap.

13. The installation as claimed in claim 12, wherein an adapter flange is arranged between the flange for fastening the apparatus housing and a mating flange of the installation housing.

14. The installation as claimed in claim 12, wherein the apparatus housing and the installation housing are given an electrically conductive form, and in that the apparatus housing is grounded via the flange for fastening the apparatus housing and the installation housing.

15. A method for producing the high-voltage installation as claimed in claim 12, wherein the flange for fastening the apparatus housing is fixed on the fastening means of the high-voltage installation, and in that, after that, the active part of the electrical apparatus is led into the installation housing, with a prestressing force being reduced, with an electrical plug-in connection of the plug-in contact and mating plug-in contact being formed and with gap-free pressing of the insulating cone and mating insulating cone being formed.

16. The method as claimed in claim 15, wherein, during or after the reduction of the prestressing force, the position of a marking of the active part is checked in an opening of the apparatus housing.

17. The method as claimed in claim 15, wherein the prestressing force is changed by turning a clamping nut supported on a securing sleeve, and in that the securing sleeve is removed after the plug-in connection has been formed and the cones pressed.

18. The apparatus as claimed in claim 1, wherein the pluggable electrical apparatus is a surge arrester.

* * * * *